UNITED STATES PATENT OFFICE.

WALTER GLAESER, OF BROOKLYN, NEW YORK.

PROCESS OF MAKING DICALCIUM PHOSPHATE.

1,235,025.     Specification of Letters Patent.     Patented July 31, 1917.

No Drawing.     Application filed May 1, 1916. Serial No. 94,602.

*To all whom it may concern:*

Be it known that I, WALTER GLAESER, a subject of the German Emperor, and a resident of Brooklyn, county of Kings, and State of New York, have invented a new and useful Improvement in Processes of Making Dicalcium Phosphate, (Case A,) of which the following is a specification, the principle of the invention being herein explained and the best mode in which I have contemplated applying that principle, so as to distinguish it from other inventions.

The present invention relates to a process for producing di-calcium phosphate which will be soluble in a standard ammonium citrate and therefore readily available for use as a fertilizer.

Di-calcium phosphate is usually prepared by the action of a sulfuric or phosphoric acid upon phosphate rock or other insoluble calcium phosphates, and also by the double decomposition of dibasic sodium phosphate with calcium chlorid. The present method is simpler than either of the above, and is relatively inexpensive. To the accomplishment of the foregoing and related ends, said invention, then, consists of the steps hereinafter fully described and particularly pointed out in the claims.

The following description sets forth in detail one approved method of carrying out the invention, such disclosed mode constituting, however, but one of various ways in which the principle of the invention may be used.

My improved method consists briefly in finely grinding phosphate rock or other phosphates and then subjecting them to the action of hydrochloric acid, thus obtaining a solution containing acid calcium phosphate and calcium chlorid, or possibly a mixture of acid calcium phosphate, free phosphoric acid and di-calcium chlorid, depending upon the amount of hydrochloric acid which is used. In order to obtain the best results I use from 4 to 6 molecules of hydrochloric acid to one molecule of phosphate rock or other insoluble phosphate, the action of the acid upon the rock taking place preferably in a wooden vessel arranged for stirring the mixture and also with means for heating it slightly in order to increase the speed of the reaction. The reaction which takes place upon the treatment of the phosphate rock with the hydrochloric acid may be represented as follows:

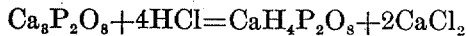

If six molecules of acid are used the reaction may be represented as follows:

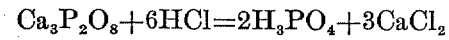

The result of this treatment is a mixture of a liquid and an insoluble residue, and the next step in the process consists in the removal of the liquid from this insoluble residue of rock, which may best be accomplished by filtration and subsequent washing of the insoluble materials. The liquid filtrate is then run into a preferably wooden vat or tank, provided with a stirrer and is first cooled to about 30° C. after which milk of lime is slowly run into the material in the tank, the mixture being stirred during this step, until the formation of di-calcium phosphate has entirely ceased. The reactions which take place during this step may be represented as follows:

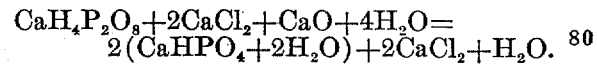

Or if six molecules of hydrochloric acid were first used then:

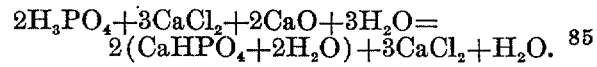

The liquid residue after this last step, is removed from the remaining insoluble phosphate preferably in a filter press, the remaining cake being washed with as little liquid as possible, and the liquid and the wash waters being evaporated to dryness in order to obtain calcium chlorid as a by-product which can of course be used in the second step of the process. The neutral calcium phosphate left as an insoluble residue is then removed to a drier and all of the moisture extracted therefrom. This product is found to be perfectly soluble in a standard ammonium citrate solution and therefore available as a fertilizer.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a method of making di-calcium phosphate, the steps which consist in treating phosphate rock with hydrochloric acid under heat, cooling the mixture to about 30° C., and then treating the liquid product with calcium hydroxid to secure amorphous di-calcium phosphate, soluble in ammonium citrate.

2. In a method of making di-calcium phosphate, the steps which consist in treating phosphate rock with hydrochloric acid under heat, cooling the mixture to about 30° C., treating the liquid product with calcium hydroxid to secure amorphous di-calcium phosphate, soluble in ammonium citrate and then separating the water insoluble neutral calcium phosphate.

3. In a method of making di-calcium phosphate, the steps which consist in treating phosphate rock with hydrochloric acid under heat, cooling the mixture to about 30° C., treating the liquid product with calcium hydroxid to secure amorphous di-calcium phosphate, soluble in ammonium citrate filtering off the precipitate and then drying the remaining neutral calcium phosphate.

Signed by me, this 28 day of April, 1916.

WALTER GLAESER.

Attested by—
D. T. DAVIES,
F. M. RECKTENWALT.

Correction in Letters Patent No. 1,235,025.

It is hereby certified that in Letters Patent No. 1,235.025, granted July 31, 1917, upon the application of Walter Glaeser, of Brooklyn, New York, for an improvement in "Processes of Making Dicalcium Phosphates," an error appears in the printed specification requiring correction as follows: Page 1, line 43, for the word "dicalcium" read *calcium;* and that the said Letters Patent should be read with this correction therein that the same may conform to the record of the case in the Patent Office.

Signed and sealed this 20th day of November, A. D., 1917.

[SEAL.]

R. F. WHITEHEAD,
*Acting Commissioner of Patents.*

Cl. 71—7.